(12) United States Patent
Peirce

(10) Patent No.: US 9,470,347 B1
(45) Date of Patent: Oct. 18, 2016

(54) FLUID LINE CONNECTOR

(75) Inventor: John M. Peirce, Portage, MI (US)

(73) Assignee: AGS I-Prop., LLC, Muskegon, MI (US)

( * ) Notice: Subject to any disclaimer, the term of this patent is extended or adjusted under 35 U.S.C. 154(b) by 935 days.

(21) Appl. No.: 13/487,509

(22) Filed: Jun. 4, 2012

Related U.S. Application Data

(60) Provisional application No. 61/494,575, filed on Jun. 8, 2011.

(51) Int. Cl.
F16L 17/00 (2006.01)
F16L 19/10 (2006.01)

(52) U.S. Cl.
CPC ..................... F16L 19/10 (2013.01)

(58) Field of Classification Search
USPC ............. 285/342, 343, 382.7, 259, 247, 255
See application file for complete search history.

(56) References Cited

U.S. PATENT DOCUMENTS

| | | | |
|---|---|---|---|
| 2,727,763 A * | 12/1955 | Ziep | 285/342 |
| 3,134,615 A | 5/1964 | Cator | |
| 3,290,069 A | 12/1966 | Davis | |
| 3,474,519 A | 10/1969 | Hallesy | |
| 3,649,050 A | 3/1972 | Woodling | |
| 3,659,881 A * | 5/1972 | Tinsley et al. | 285/249 |
| 3,830,532 A | 8/1974 | Roberts | |
| 3,923,323 A | 12/1975 | Brogan | |
| 4,627,644 A | 12/1986 | Ekman | |
| 4,705,302 A | 11/1987 | Beiley | |
| 5,028,078 A | 7/1991 | Schwarz et al. | |
| 5,551,735 A | 9/1996 | Takayanagi et al. | |
| 5,655,796 A | 8/1997 | Bartholomew | |
| 5,934,714 A | 8/1999 | Sugiyama et al. | |
| D461,545 S | 8/2002 | Nishio | |
| 6,938,437 B2 | 9/2005 | Velez et al. | |
| 7,108,288 B2 | 9/2006 | Bennett et al. | |
| 7,350,828 B2 | 4/2008 | Williams | |
| 2004/0041399 A1 * | 3/2004 | Chelchowski et al. | 285/343 |
| 2006/0049632 A1 | 3/2006 | Williams | |
| 2006/0273581 A1 | 12/2006 | Williams et al. | |
| 2007/0164563 A1 | 7/2007 | Arstein et al. | |
| 2008/0048441 A1 | 2/2008 | Bennett et al. | |
| 2010/0133812 A1 | 6/2010 | Williams et al. | |
| 2010/0140928 A1 | 6/2010 | Becker et al. | |
| 2010/0194107 A1 | 8/2010 | Marshall et al. | |

OTHER PUBLICATIONS

S.U.R. & R. Product Catalog, 2010.

* cited by examiner

Primary Examiner — Aaron Dunwoody
(74) Attorney, Agent, or Firm — Gardner, Linn, Burkhart & Flory, LLP

(57) ABSTRACT

A fluid line connector facilitates the rapid and inexpensive replacement or repair of damaged portions of a fluid line or conduit, such as a vehicular refrigerant line, oil line, fuel line, or the like. The fluid line connector includes a main body that can accommodate different sizes of fluid lines, with ferrules and conduit couplers attached at opposite ends of the main body. The conduit couplers, ferrules, and seals cooperate with the main body to retain and seal the respective open ends of the fluid line in the connector, thus creating a secure and sealed junction or connection along a fluid conduit.

13 Claims, 9 Drawing Sheets

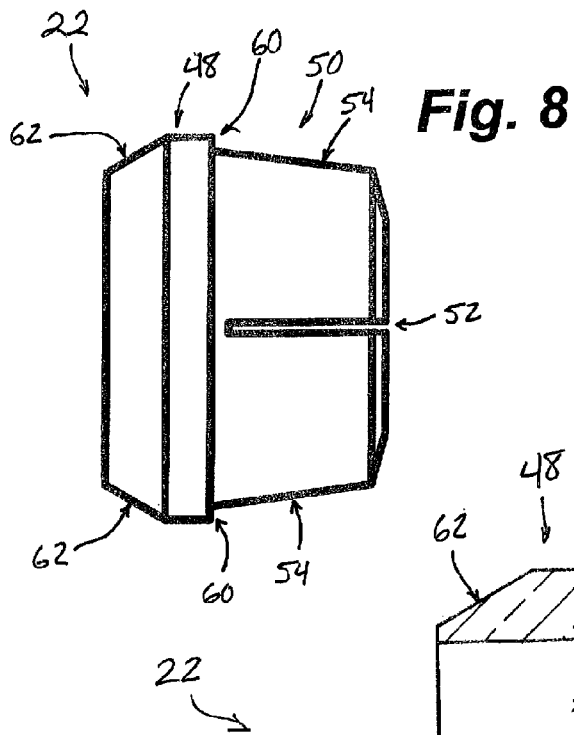
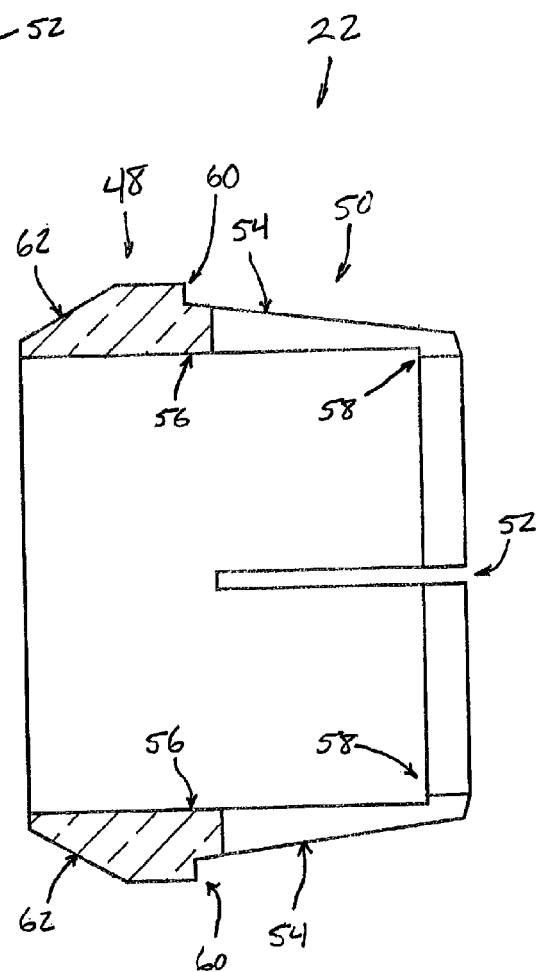
Fig. 8
Fig. 9

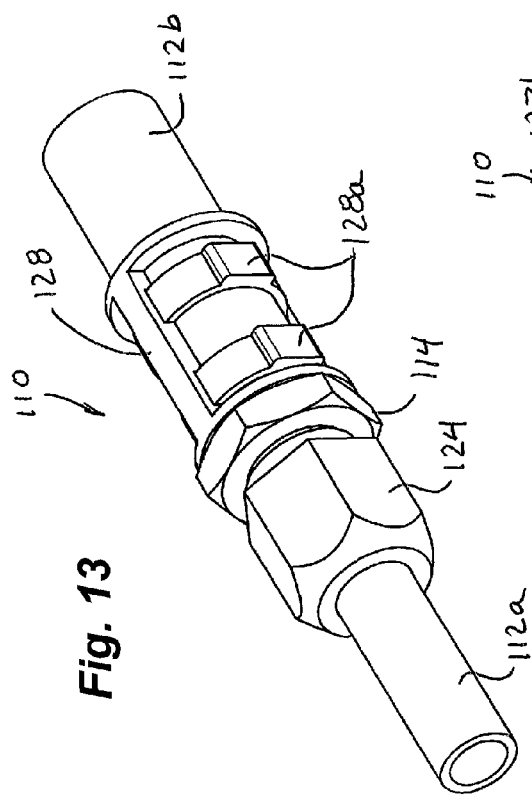
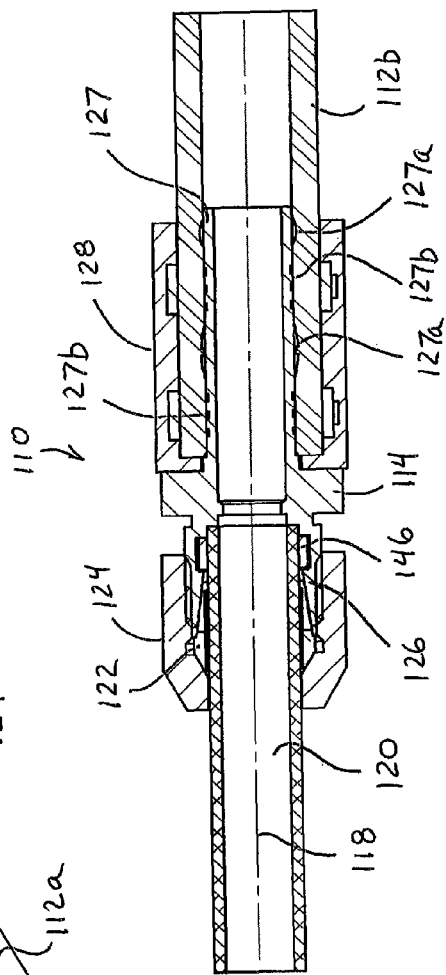
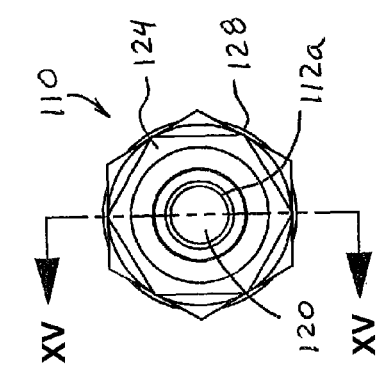

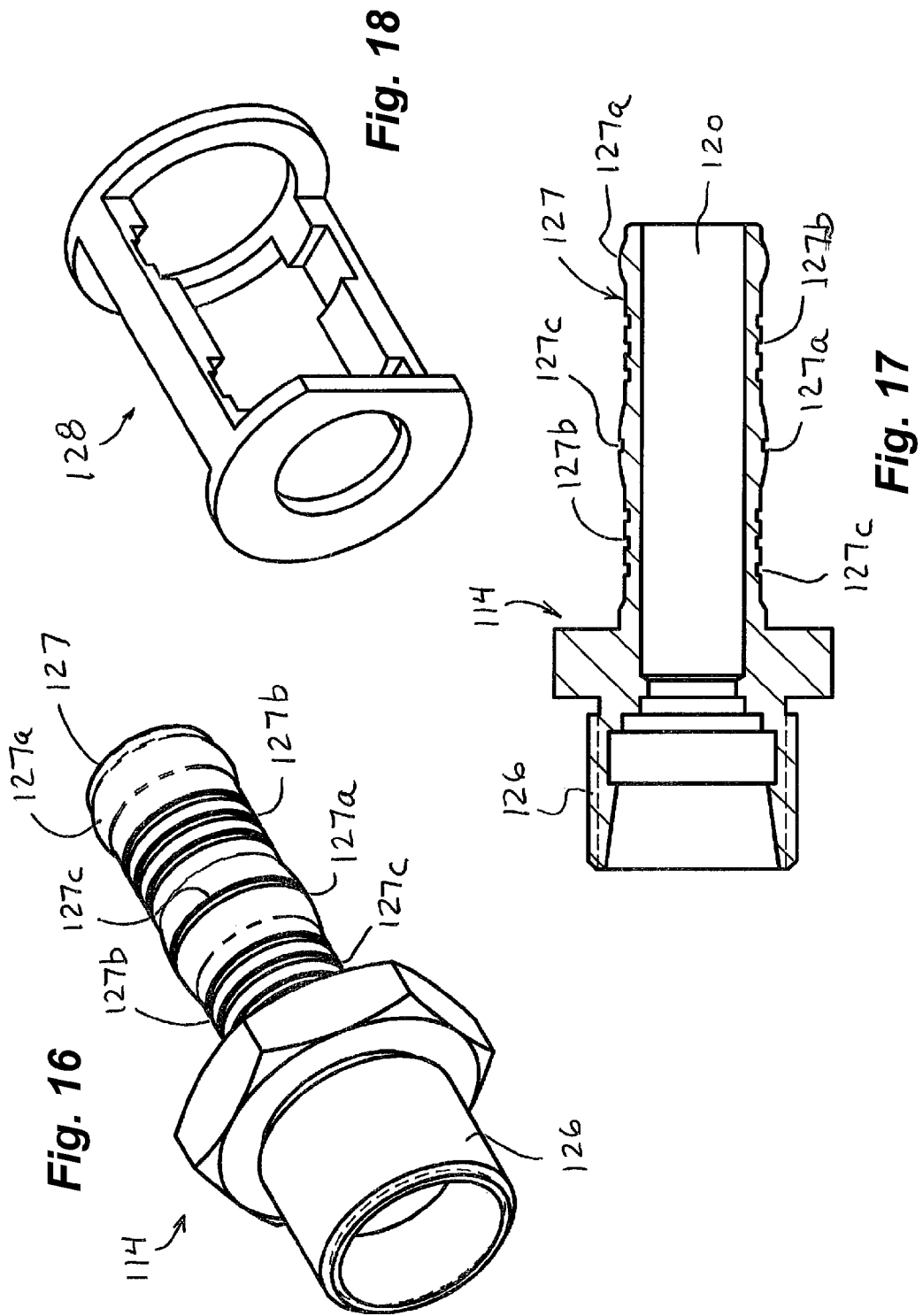

FLUID LINE CONNECTOR

CROSS REFERENCE TO RELATED APPLICATION

The present application claims the benefit of U.S. provisional application Ser. No. 61/494,575, filed Jun. 8, 2011, which is hereby incorporated herein by reference in its entirety.

FIELD OF THE INVENTION

The present invention relates generally to couplers or connectors for attaching the ends of fluid lines to one another or to other fluid couplings.

BACKGROUND OF THE INVENTION

Fluid lines, conduits, hoses, and the like are commonly used for conveying vehicular fluids from one portion of a vehicle to another. Such conduits may be associated with fuel, engine and transmission oils and other lubricants, power steering fluid, coolants or refrigerants, hydraulic brake fluid, shock absorber fluid, ride height control fluid, and the like. When such fluid lines require repair, such as due to pinhole leaks, cracks, impact damage, or the like, it is generally desirable and significantly faster and more economical to repair the damaged section rather than replace the entire fluid line. Because many such fluid lines operate at elevated fluid pressures, it is desirable for fluid line couplers or other repair devices to provide secure and sealed repair of a damaged fluid line, so that the repaired fluid line can be returned to normal service.

SUMMARY OF THE INVENTION

The present invention provides a fluid line connector for use in repairing fluid conduits, which are typically rigid or semi-rigid fluid lines, such as typically found on vehicles. For example, the fluid line connectors may be used to repair or replace damaged sections of fuel lines, oil lines, air conditioner refrigerant lines, or the like, or may be used as a fluid line fitting or portion of a fitting for coupling a fluid line to another fluid conduit.

The fluid line connector of the present invention includes a main body with a profiled or varying-diameter inner surface that defines a fluid passageway. The profiled inner surface defines a series of circular stepped regions that allow the fluid line connector to be adapted for use on fluid lines of different diameters or sizes. An annular ferrule is partially positioned in an open end of the main body, and at least a portion of the ferrule is radially compressible to engage or impinge on the outer surface of a fluid line that is positioned in the fluid passageway of the main body. The fluid line is typically urged into abutment with one of the stepped regions prior to compressing the ferrule. An annular conduit coupler is attached to an outer surface of the main body, and has an inner surface that engages the ferrule to bias or urge the ferrule inwardly relative to the main body as the coupler is moved or tightened onto the body. This movement of the ferrule results in compression of the flexible portion of the ferrule due to engagement of corresponding ramped surfaces of the ferrule and the main body. By tightening the conduit coupler with a fluid line positioned in the main body, the ferrule is compressed into tight engagement with the fluid line, which helps secure the fluid line in the main body. Optionally, the fluid line connector may comprise a double-ended connector, such that two fluid lines having the same or different diameters may be coupled to one another using a single fluid line connector.

Optionally, the outer surface of the connector's main body includes a threaded outer portion, and the inner surface of the conduit coupler includes a threaded inner portion corresponding to the outer threaded portion of the main body, so that the conduit coupler and the ferrule are axially movable together relative to the main body via rotation of the conduit coupler about the threaded body. Optionally, the inner surface of the main body includes a seal-receiving portion for receiving an annular seal in an annular space defined between the inner surface of the main body and the outer surface of the fluid line. The ferrule may include a plurality of longitudinal slots in a circumferentially-spaced arrangement, to facilitate radial compression of the ferrule. The ferrule may further include a radially inwardly-directed annular shoulder at its compressible portion, for impinging on the outer surface of the fluid conduit, which enhances the ferrule's ability to secure the conduit or fluid line in the body of the connector.

Thus, the fluid line connector of the present invention provides for the secure repair of damaged fluid lines, such as those that may be found on a vehicle. The connector is adaptable for use on fluid lines of different diameters, and can also be used for connecting the ends of fluid lines to other couplings or fluid conduits. The present invention can provide a low-cost, easy-to-install, and leak-resistant repair, which resists inadvertent pull-out of the fluid line from the connector.

These and other objects, advantages, purposes, and features of the present invention will become apparent upon review of the following specification in conjunction with the drawings.

BRIEF DESCRIPTION OF THE DRAWINGS

FIG. 8 is a side elevation of a ferrule of the fluid line connector;

FIG. 9 is a side sectional elevation of the ferrule;

FIG. 13 is a perspective view of another fluid line connector in accordance with the present invention;

FIG. 14 an end elevation of the fluid line connector of FIG. 13;

FIG. 15 is a side sectional view of the fluid line connector, taken along line XV-XV of FIG. 14;

FIG. 16 is a perspective view of a main body of the fluid line connector of FIG. 13;

FIG. 17 is a side sectional view of the main body; and

FIG. 18 is a perspective view of a crimping element for the fluid line connector of FIG. 13.

DESCRIPTION OF THE PREFERRED EMBODIMENT

Figure 1:
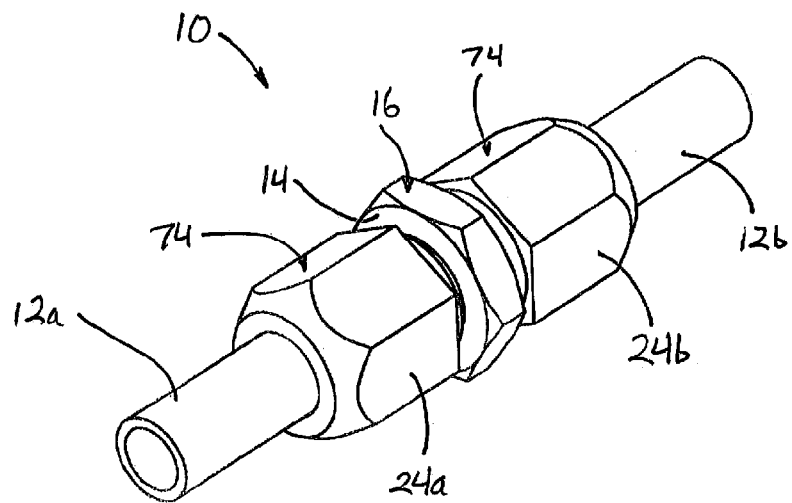
FIG. 1 is a perspective view of a fluid line connector in accordance with the present invention.
Figure 2:
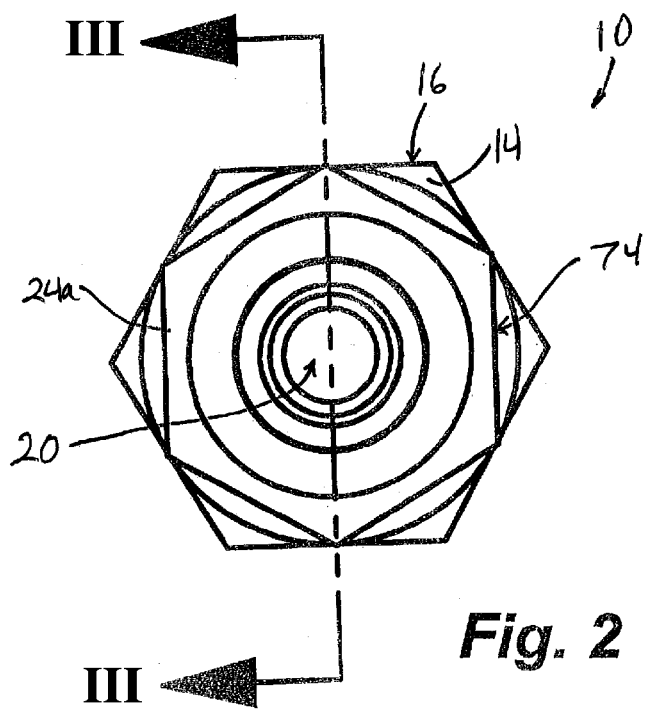
FIG. 2 is an end elevation of the fluid line connector of FIG. 1.
Figure 3:
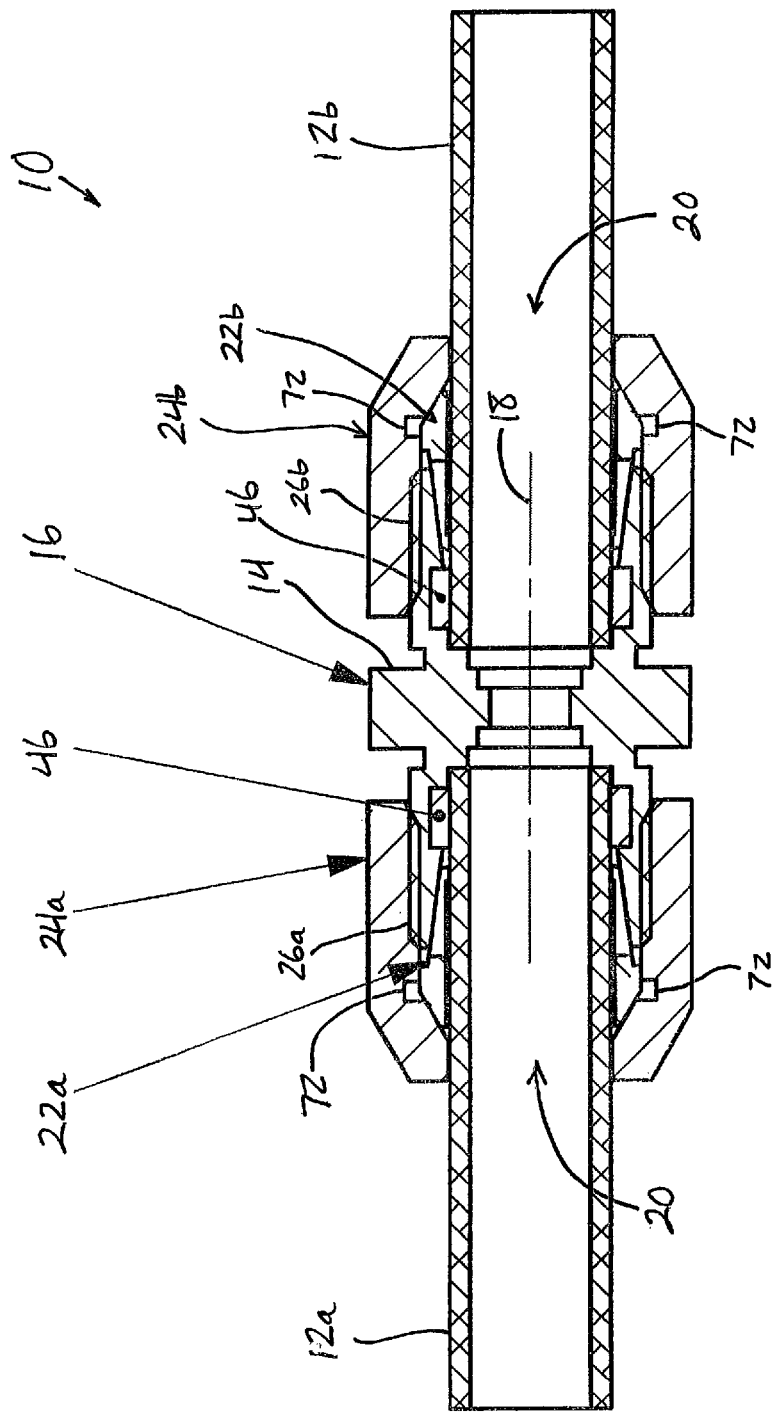
FIG. 3 is a side sectional view of the fluid line connector, taken along line III-III of FIG. 2.

Referring now to the drawings and the illustrative embodiments depicted therein, a fluid line connector 10 is provided for the secure coupling of respective ends of fluid lines or conduits 12a, 12b (FIGS. 1 and 3). For example, the two fluid lines 12a, 12b may be formed from a single fluid line that was cut to remove a damaged section of the line. In the illustrated embodiment, fluid line connector 10 is symmetrical about a lateral axis or a plane that passes through a main body 14 at a central gripping portion 16 (which may typically have a non-circular outer surface, such as a hexagonal shape as shown). Referring to FIG. 3, fluid line connector 10 has a longitudinal central axis 18 along which a fluid passageway 20 is defined through the connector (FIGS. 2 and 3). Two ferrules 22a, 22b are positioned on respective sides of main body 14, and a conduit coupler or collar 24a, 24b couples the respective ferrules 22a, 22b to main body 14, to secure fluid lines 12a, 12b in fluid line connector 10, as will be described in more detail below. Although shown as a double-ended connector for connecting two fluid lines together, it will be appreciated that the principles of the present invention may be practiced as a single-end fluid line connector, such as for connecting a fluid line to another type of fluid conduit or fluid coupling, rather than the double-ended line-to-line fluid line connector 10 described in detail herein.

Figure 5:
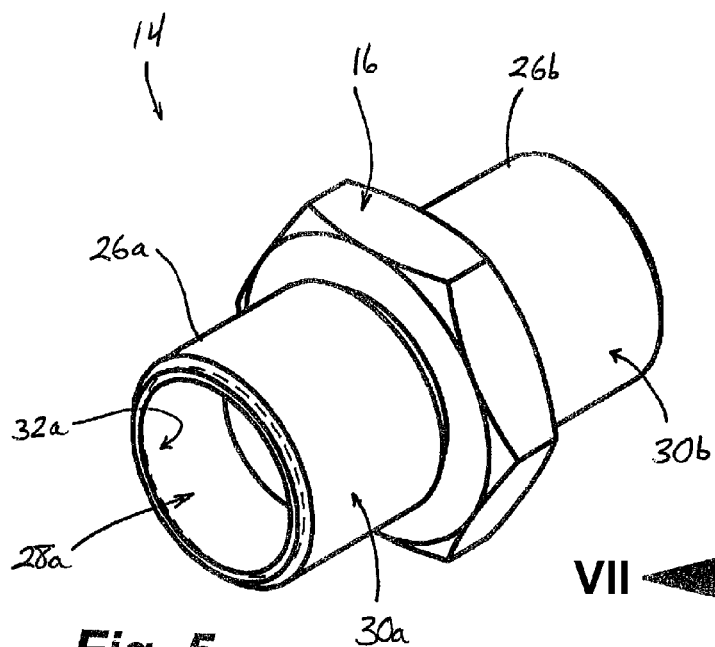
FIG. 5 is a perspective view of a main body of the fluid line connector.

Main body 14 includes a pair of hollow cylindrical end portions 26a, 26b (FIGS. 5 and 7), each defining a portion of fluid passageway 20. Each end portion 26a, 26b has an outboard open end 28a, 28b for receiving a respective one of fluid lines 12a, 12b. End portions 26a, 26b have threaded outer surfaces 30a, 30b for engaging conduit couplers 24a, 24b, and further have profiled or shaped or ramped (i.e. varying-diameter) inner surfaces 32a, 32b. Starting with the open outboard ends 28a, 28b and moving inwardly, with reference to FIG. 7, the profiled or shaped inner surfaces 32a, 32b each include a ramped surface or portion 34 that is generally frusto-conical in shape with a maximum inner diameter at its outboard end (i.e., at open outboard ends 28a, 28b), and a minimum inner diameter at its inboard end. Located further inboard from ramped outer portion 34 is a lip or shoulder 36 that transitions from the inboard ends of ramped outer portion 34 to a seal-receiving portion 38 with a substantially constant inner diameter.

Figure 7:
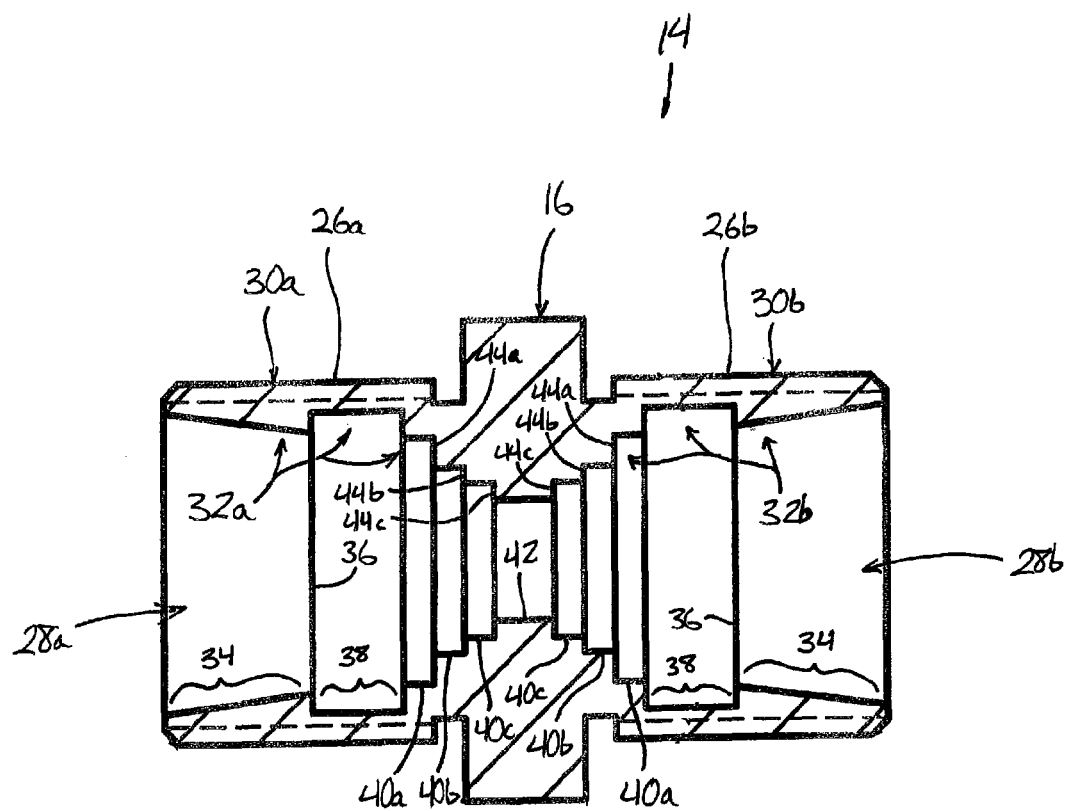
FIG. 7 is a side sectional view of the main body, taken along line VII-VII of FIG. 6.

Seal-receiving portions 38 of inner surfaces 32a, 32b provide an annular space between inner surface 32 and the outer surface of a fluid line, such as fluid line 12a (FIG. 7). This annular space receives a resilient annular seal 46 (FIG. 3), which has an inner diameter generally corresponding to the outer diameter of the fluid line 12a, and an outer diameter generally corresponding to the inner diameter of inner surface 32 at seal-receiving portion 38. In order to provide a fluid-tight seal, annular seal 46 may be dimensioned to have, in its relaxed state, a slightly smaller inner diameter than the outer diameter of the fluid line 12a, to have a slightly larger outer diameter than seal-receiving portion 38, so that annular seal 46 is at least slightly compressed between the outer surface of fluid line 12a and the inner surface of seal-receiving portion 38. When it is desired to accommodate a smaller diameter fluid line in the fluid line connector 10, such as fluid line 12a' of FIG. 4, an annular seal 46' having a smaller inner diameter is used to fill the extra space between seal-receiving portion 38 and the outer surface of the smaller fluid line 12a'.

In order to accommodate different diameter tubes or lines, the main body 14 may be formed to engage and partially retain the ends of fluid lines having selected diameters. For example, and as shown in FIG. 7, located further inboard from seal-receiving portion 38 are a series of stepped regions 40a, 40b, 40c, with each stepped region having a diameter that is less than the diameter of the stopped region located immediately outboard thereof. Thus, an outboard stepped region 40a is immediately adjacent seal-receiving portion 38, and has a smaller diameter than the seal-receiving portion, while a middle stepped region 40b (located immediately inboard of outboard stepped portion 40a) has a still smaller inner diameter, and an inboard stepped portion 40c (located immediately inboard of middle stepped region 40b) has a still smaller inner diameter. It will be appreciated that the diameters of each stepped portion 40a-c may correspond to a standard fluid line size, so that main body 14 can be used to join multiple different sizes of tubing or fluid lines.

Figure 6:
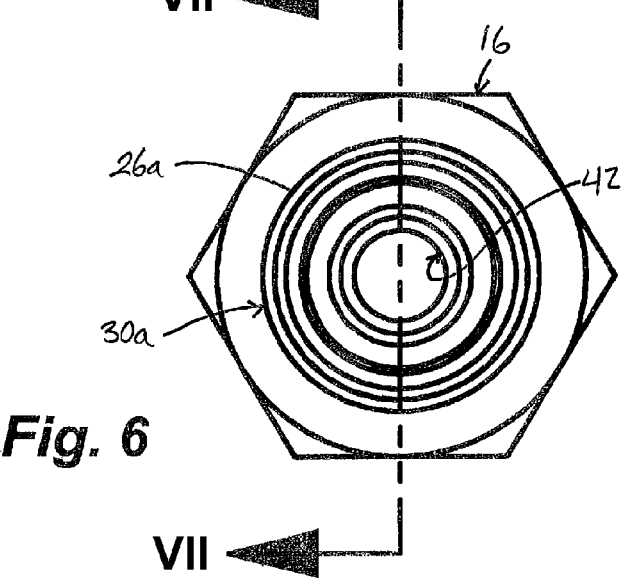
FIG. 6 is an end elevation of the main body.

Further, the main body 14 includes a constant-diameter inner or central portion or passageway 42 located immediately between the two inboard stepped regions 40c of the respective end portions 26a, 26b (FIGS. 6 and 7). Stepped regions 40a-c define respective annular shoulder regions 44a-c that provide an abutment or stop surface for a given size (outer diameter) of fluid line, while central portion or passageway 42 allows for fluid flow through the body between the inserted fluid lines. For example, in the illustrated embodiment of FIG. 3, fluid lines 12a and 12b have relatively large outer diameters that correspond to the annular shoulder regions 44a defined between outboard stepped region 40a and middle stepped region 40b, and in the illustrated embodiment of FIG. 4, another fluid line 12a' has a smaller diameter that corresponds to the diameter of middle stepped portion 40b, so that fluid line 12a' lies in abutment with annular shoulder region 44b. Thus, the main body can be readily adapted for different sized tubes or lines via selection of an appropriate sized resilient seal 46 and appropriate ferrule 22.

Ferrules 22a, 22b are identical to one another in the illustrated embodiment, and therefore are referred to generally with reference numeral 22, as in FIGS. 8 and 9. Like the other components of fluid line connector 10, ferrule 22 has a generally annular shape. Each ferrule 22 includes an outboard head portion 48 that remains outboard of the respective outboard ends 28a, 28b of main body 14 the when the ferrules are installed at the main body 14. Ferrule 22 further includes a resilient or flexible inboard portion 50, which extends through the open outboard ends 28a, 28b and at least partially along the ramped portion 34 of the profiled or shaped inner surface 32 of main body 14.

Figure 4:
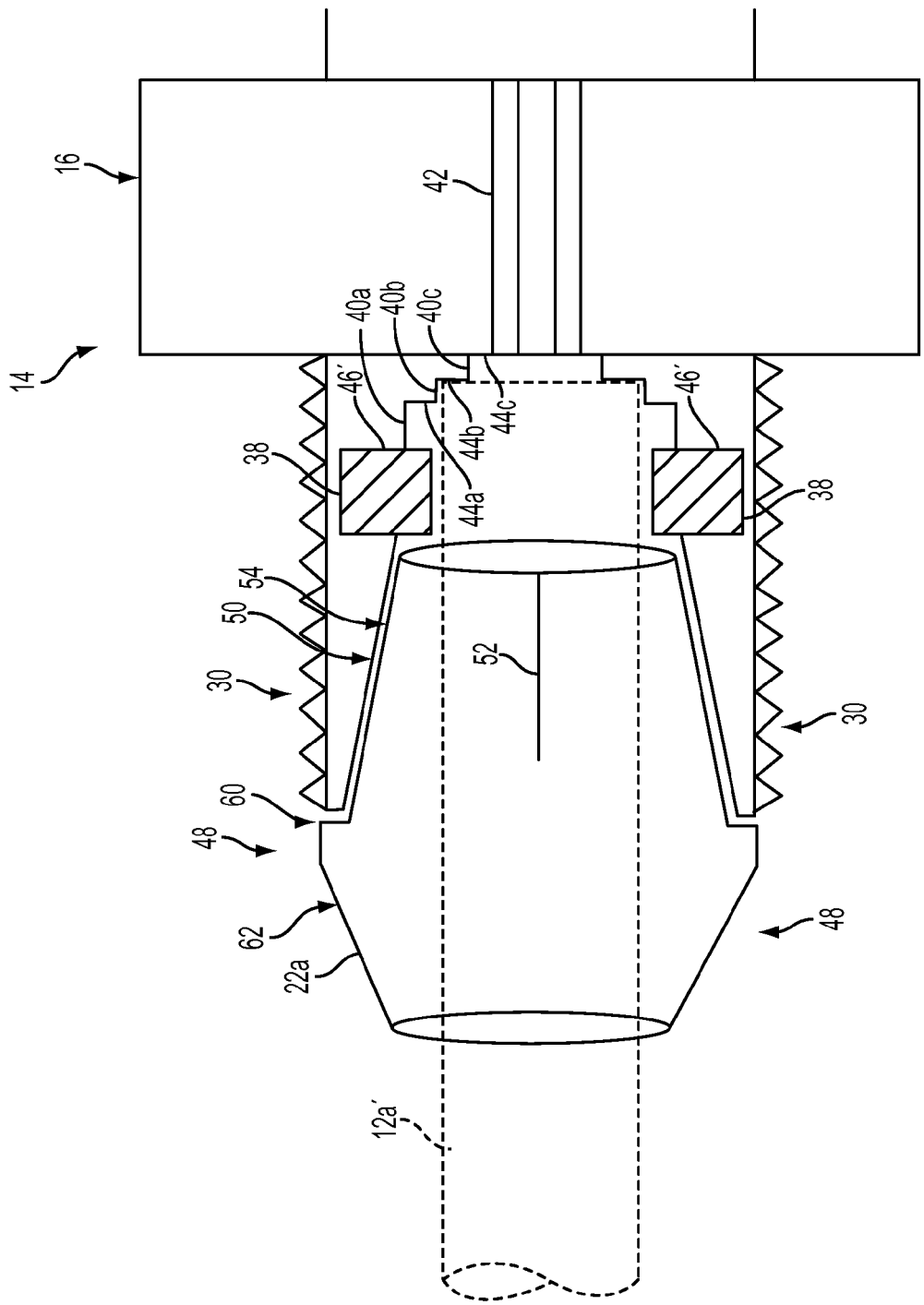
FIG. 4 is an enlarged side and partial sectional view of an end portion of the fluid line connector, shown without a conduit coupler.

Flexible inboard portion 50 of ferrule 22 is radially inwardly compressible due to a plurality of longitudinal slots 52 that are formed at least partially along flexible inboard portion 50 and terminate near outboard head portion 48. As best shown in FIGS. 8 and 9, flexible inboard portion 50 includes a ramped or generally frusto-conical outer surface 54 that generally corresponds to the shape of ramped outer portion 34 of the inner surface 32 of main body 14, such as shown in FIGS. 3 and 4.

Ferrule 22 has an inner surface 56 that defines a generally constant inner diameter when in its relaxed (i.e., uncompressed or unconstricted) configuration (FIG. 9). Flexible inboard portion 50 of ferrule 22 includes, at its inboard end portion (i.e., opposite outboard head portion 48) a radially inwardly-projecting shoulder or lip 58, which has a smaller diameter than the rest of inner surface 56. This shoulder or lip 58 enhances the ability of ferrule 22 to impinge or engage or bite into the outer surface of a fluid line in order, to more securely retain the fluid line at the fluid line connector 10 in a manner that will be more fully described below. The diameter of inner surface 56 may generally correspond to the outer diameter of the fluid line that the ferrule is configured to engage, while the inner diameter of the shoulder or lip 58 may even more closely correspond to the outer diameter of the fluid line, and preferably may have a slightly smaller diameter than the fluid line to provide an interference fit, for example. The shoulder or lip may provide a generally flat engaging surface (such as shown in FIG. 9), or may comprise a pointed circumferential tooth that bites into the tube or line as the ferrule is compressed around the tube or line.

Optionally, the ferrule may comprise multiple lips or teeth disposed along the inner surface 56 to bite into the tube or line at multiple locations to further enhance retention of the tube or line in the connector. Optionally, it is envisioned that a plurality of teeth or threads may be established at the inner surface and along or substantially along the length of the ferrule. Such a configuration would allow the ferrule to bite into the tube along the portion of the tube within the ferrule (and the tube may be threaded into the ferrule before tightening or clamping the ferrule onto the tube). The lip or tooth or teeth or threads of the ferrule may slightly bite into the outer surface of the tube when the coupler is tightened, such as by penetrating the outer surface of the tube by about 0.002 inches or more, such as, for example, about 0.003 inches to about 0.005 inches, preferably around the circumference of the tube, and optionally longitudinally along a portion of the tube as well. The lip or tooth or teeth of the ferrule thus bite into the tube to enhance retention of the tube in the connector, without piercing the tube wall.

Outboard head portion 48 of ferrule 22 includes a lip or shoulder 60 having a greater diameter than the ramp outer surface 54 of flexible inboard portion 50. Shoulder 60 can act as a stop surface by contacting the respective end portion 26a, 26b of main body 14 at the open outboard ends 28a, 28b thereof. Outboard head portion 48 further includes a ramped or frusto-conical outboard outer surface 62 that is engaged by the conduit coupler 24, so that the ferrule 22 can be urged or biased inwardly into one of the end portions 26a, 26b of main body 14, as discussed below.

Figure 10:
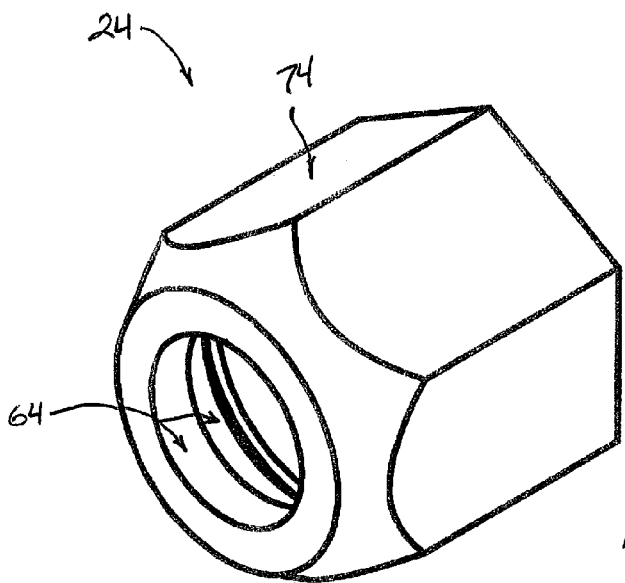
FIG. 10 is a perspective view of a conduit coupler of the fluid line connector.
Figure 11:
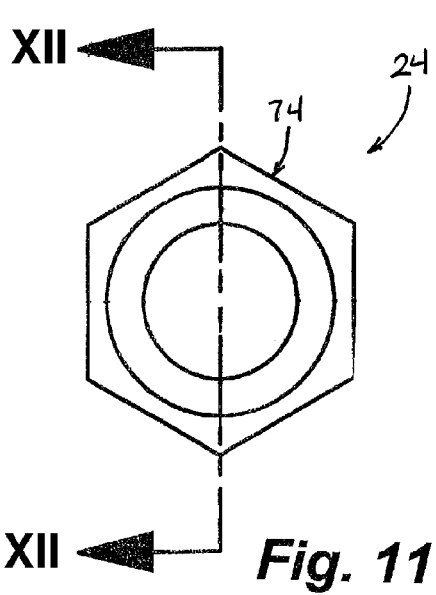
FIG. 11 is an end elevation of the conduit coupler.
Figure 12:
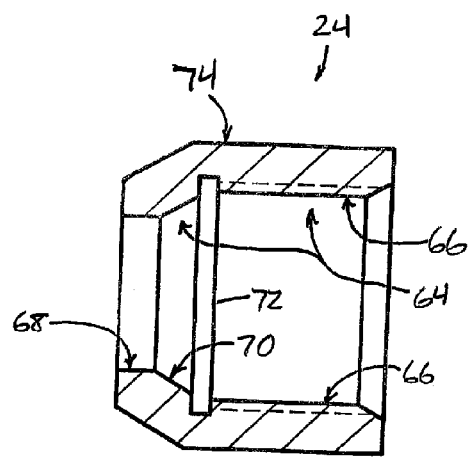
FIG. 12 is a side sectional elevation of the conduit coupler.

Conduit couplers or collars 24a, 24b are substantially identical to one another, and therefore are referred to generally with reference numeral 24, as in FIGS. 10-12. Conduit coupler 24 includes an inner surface 64 having an inboard threaded region 66, with an inner diameter that generally corresponds to the outer diameter of threaded outer surfaces 30 of main body 14 (FIG. 12). Inboard threaded region 66 is configured to threadedly engage threaded outer surface 30 of main body 14, so that rotation of conduit coupler 24 relative to main body 14 causes the conduit coupler 24 to translate longitudinally along the longitudinal central axis 18. At the outboard end of the collar 24, inner surface 64 has an inner diameter that generally corresponds to the outer diameter of the fluid line 12, which is less than the inner diameter of inner surface 64 at inboard threaded region 66. A ramped or frusto-conical surface portion 70 transitions between the larger inboard threaded region 66 and the smaller outboard surface portion 68 (FIG. 12). The ramped inner surface portion 70 of inner surface 64 generally corresponds to the ramped outer surface 62 of the outboard head portion 48 of ferrule 22, so that these ramped surfaces engage one another as shown in FIG. 3, allowing conduit coupler 24 to be used to urge or bias the corresponding ferrule 22 inwardly relative to main body 14, along the longitudinal axis 18. An annular channel 72 is established between ramped surface portion 70 and inboard threaded portion 66, and provides a space at the end of the threaded portion 66 to limit or substantially preclude bottoming out of the coupler onto the threaded end portion of the body. Conduit coupler 24 further includes an outer surface 74 having a non-circular gripping portion, such as the hexagonal gripping portion shown in the figures, to facilitate turning or rotating the coupler relative to the main body to tighten or loosen the coupler.

When ferrule 22 is installed at body 14 and within coupler 24, shoulder 60 is spaced outboard of the outer end of the respective end portion 26a, 26b (FIG. 3). This space permits longitudinal repositioning or adjustment of ferrule in end portion 26a or 26b of main body 14, and as long as there is a space between shoulder 60 and the outer end of the respective end portion 26a, 26b, ferrule 22 can be further tightened into engagement with the fluid line. It will also be observed, with reference to FIG. 3, that when ferrule 22 is installed, its inboard end (i.e. where shoulder 58 is located) is spaced from seal 46, so that the ferrule does not impinge on the seal when the ferrule is urged inwardly by the conduit coupler 24. The space between the inboard end of ferrule 22 and seal 46 may be approximately equal to (or slightly larger than) the space between the ferrule shoulder 60 and the outer end of the respective end portion 26a, 26b of main body 14, so that conduit coupler 24 cannot be tightened so far as to cause the ferrule's inboard end to contact or compress the seal 46. However, it will be appreciated that if it were desirable to allow the ferrule to compress the seal, such as to affect the sealing properties, the ferrule's dimensions could be altered to achieve this, such as by shifting the shoulder 60 outboard or lengthening the flexible inboard portion 50 of the ferrule.

Accordingly, fluid line connector 10 may be readily assembled from relatively few parts to secure and seal the ends of two fluid lines 12a, 12b, and may be adapted to secure different sizes of fluid lines without need for all different connector components. Typically, fluid line connector 10 is substantially pre-assembled, including installation of the annular seals 46 and the ferrules 22a, 22b in the main body 14, and at least loosely attaching the conduit couplers 24 to the end portions 26a, 26b of the main body 14, prior to the installation of fluid lines 12a, 12b. However, the order or method of assembly can be varied, such as by first installing the conduit couplers 24a, 24b onto respective fluid lines 12a, 12b, followed by installing the respective ferrule 22a, 22b and annular seals 46 onto the fluid lines. In this way, the ferrules and conduit couplers can be at least temporarily retained on the ends of the fluid lines by the annular seals, which are themselves retained on the line ends by a friction or interference fit, prior to attachment with the main body 14.

Regardless of the order in which the pre-assembly is accomplished, the fluid lines 12a, 12b may then be inserted into the respective end portions 26a, 26b of the main body, as shown in FIG. 3. Each fluid line 12a, 12b is typically urged fully into the main body 14, until the end of each fluid line abuts a corresponding one of the stepped regions 40a-c (such as outboard stepped region 40a as shown in FIG. 3) with the seals 46 seated between fluid lines 12a, 12b and seal-receiving regions 38 of the main body's inner surface 32. Each conduit coupler 24a, 24b may then be threaded onto the end portions 26a, 26b of main body and then rotated, causing the conduit couplers 24*a*, 24*b* to move longitudinally toward central gripping portion 16 due to engagement of the respective threads 30, 66 of conduit couplers 24 and end portions 26*a*, 26*b*.

The non-circular central gripping portion 16 of main body 14, and the non-circular portions of outer surfaces 74 of the conduit couplers 24, facilitate the use of a wrench or other tool to rotate the conduit couplers on the main body. Optionally, couplers 24*a* and 24*b* may be rotated simultaneously for faster coupling of the fluid lines 12*a*, 12*b*, by simultaneously gripping their outer surfaces 74 with respective wrenches or other gripping tools, and rotating them in opposite directions (i.e., without need for gripping the central gripping portion 16 of main body 14). This allows equal torque to be applied simultaneously to each conduit coupler 24*a*, 24*b* so that the conduit couplers can be tightened more or less simultaneously.

As each conduit coupler 24 is tightened, its ramped inner surface portion 70 engages the ramped outer surface portion 62 of ferrule 22 to urge the ferrule's flexible inboard portion 50 further into the respective end portion 26*a*, 26*b* of main body 14. This causes the ferrule's ramped outer surface 54 to slide along the ramped inner surface portion 34 of the respective end portion 26*a* or 26*b* of main body 14. The sliding interaction of these ramped surfaces causes the flexible inboard portion 50 of ferrule 22 to be radially inwardly compressed by the ramped surface portion 34 of main body 14, with the degree or extent or distance of compression corresponding to the longitudinal position of ferrule 22*a*, 22*b* relative to the respective end portion 26*a*, 26*b*. Because the inner diameter of the inner surface 56 of ferrule 22 closely corresponds to the outer diameter of the respective fluid line 12*a*, 12*b*, tightening each conduit coupler 24 causes the flexible inboard portion 50 of the ferrule 22 (including the inboard shoulder or lip 58) to compress or impinge against the outer surface of the fluid line, which results in the fluid line being securely retained in the respective end portion 26*a* or 26*b* of main body 14.

As noted above, each fluid line 12*a*, 12*b* is substantially sealed against leakage by a frictional or interference fit above annular seal 46. Optionally, a glue or sealant, such as anaerobic glue or the like, may be applied to the threads 30 and 66, to retain and further seal the conduit couplers 24*a*, 24*b* at the respective end portions 26*a*, 26*b* of main body 14. This may provide a more permanent junction along the fluid line.

If removal of a fluid line 12*a* or 12*b* from fluid line connector 10 is desired, the corresponding conduit coupler 24*a* or 24*b* may simply be rotated to loosen the conduit coupler and allow the respective ferrule 22*a* or 22*b* to move longitudinally outwardly from the end portion 26*a* or 26*b* of main body 14. The resilience of flexible inboard portion 50 of the ferrule 22 causes the flexible inboard portion to expand outwardly when it is not held in place by the conduit coupler 24, which relieves its impingement or compression against the outer surface of the fluid line 12*a* or 12*b* so that the fluid line may be removed from main body 14, although the fluid line may still be at least frictionally retained in the fluid passageway 20 by annular seal 46.

Fluid line connector 10 is a double-ended connector typically used for joining two fluid lines of equal diameter, but it will be appreciated that the same main body 14 can be used for joining two fluid lines of different diameters. For example, if fluid line 12*b* of FIG. 3 were replaced with a smaller-diameter fluid line (such as fluid line 12*a*' of FIG. 4), a seal having a smaller inner diameter (such as seal 46) can be provided, along with a different-sized ferrule and conduit coupler. A ferrule for smaller-diameter fluid lines would typically have a reduced inner diameter as compared to that of ferrule 22, and the corresponding conduit coupler would also have a reduced inner diameter in its outboard regions (but not including the inboard threaded region 66, which would remain the same). The smaller diameter ferrule and conduit couplers, along with a seal having a smaller inner diameter, would allow the connector to accommodate the smaller-diameter fluid line 12*a*', or another (smaller) fluid line.

Thus, fluid line connectors 10 can be adapted for use with different sizes of fluid lines, without requiring different main bodies. This is advantageous since main body 14 may be a more costly component of the fluid line connector, and there may be a significant cost advantage in manufacturing a larger volume of slightly more complex main bodies (i.e., those able to accommodate different sized fluid lines) as compared to manufacturing smaller volumes of several different (and perhaps slightly less complex) main bodies that each are sized to fit only one fluid line size.

With the main body 14 of fluid line connector 10 configured to receive different sizes of fluid lines, only the simpler and less costly annular seal 46, ferrule 22, and conduit coupler 24 would be manufactured in different sizes to correspond to the different sizes of fluid lines. This adaptability of the main body can also allow fluid line connectors to be packaged as a kit that can accommodate multiple sizes of fluid lines, or to be packaged as a fluid line connector for a single size of fluid line, as desired, with each kit or package including the same main bodies 14.

Although shown and described as comprising a double-ended connector for connecting the opposed ends of tubes together, it is envisioned that the fluid line connector of the present invention may have a body with one threaded end and coupler and ferrule as discussed above for connecting to one tube end, with the other end of the connector configured for being inserted into another tube end and sealed or retained thereat via other suitable retention means. For example, and with reference to FIGS. 13-18, a fluid line connector 110 for the secure coupling of respective ends of fluid lines or conduits 112*a*, 112*b* has a longitudinal central axis 118 along which a fluid passageway 120 is defined through the connector, with one end 126 of the body 114 being threaded for retaining the tube end 112*a* via a ferrule 122 and a conduit coupler or collar 124 and seal 146, such as in a similar manner as discussed above. The other end 127 of the body 114 is configured to be received in the other tube or conduit 112*b*, and may be retained therein via a clamping or crimping element 128. The end 126 of body 114 and the ferrule 122 and conduit coupler 124 and seal 146 of connector 110 may be substantially similar to the correspondingly named components of fluid line connector 10, discussed above, such that a detailed discussion of these aspects of the connectors need not be repeated herein.

In the illustrated embodiment, and as best shown in FIGS. 16 and 17, the end 127 of body 114 has a non-uniform diameter so that there are larger diameter portions 127*a* and smaller diameter portions 127*b*. When the tube end 112*b* is slid over the end 127 of body 114, the crimping element 128 is disposed at the end 127 of body 114 and crimping bands 128*a* (FIG. 13) are crimped or compressed generally at the smaller diameter portions 127*b* to substantially retain and seal the tube 112*b* at the end 127 of body 114. Optionally, and as best shown in FIGS. 16 and 17, the body end 127 may include a plurality of ridges or grooves 127*c* established therearound and at the larger diameter portions 127*a* and/or smaller diameter portions 127*b* to bite into the inner surface of the tube 112b to assist in retaining the tube at the body end 127 when the crimping elements 128, 128a are disposed at the body end and crimped threat.

As can be seen with reference to FIG. 15, the diameter of the fluid passageway 120 is generally the same at the tube end 112a and at the body end 127 (such that the tube 112b is larger in diameter than the tube 112a). If a smaller diameter tube were inserted into the body (for attachment/connection via the ferrule and coupler), it may be desirable to use a body having a smaller diameter end that is received in the other tube, so that the fluid passageway remains generally constant through the fluid line connector. Optionally, the threaded and tapered end of the bodies may remain generally constant for some sizes of tubes, while the crimping end of the body may vary depending on the particular application of the fluid line connector. Optionally, for substantially larger or substantially smaller fluid lines, the threaded and tapered end of the bodies may also vary to accommodate all sizes or diameters of fluid lines over a range of fluid line connectors.

Therefore, the present invention provides a fluid line connector that may be used to repair or replace sections of vehicle fluid lines, such as refrigerant lines, oil lines, fuel lines, and the like, while avoiding the complete replacement of fluid lines, which can be very costly and time consuming. For example, repairs to small damaged portions of fluid lines may be accomplished simply by cutting out the small damaged portion of a fluid line and joining the exposed open ends of the fluid line with a single fluid line connector. Larger damaged portions of a fluid line may be repaired, for example, by cutting out the larger damaged portion of the line, obtaining a replacement line section having a length and shape that generally corresponds to the removed section, and grafting the replacement line section into place using two fluid line connectors, one at each end of the replacement line. In addition, the fluid line connector may be used to join different sizes of fluid lines, including the option of joining a larger fluid line to a smaller fluid line, if desired. The fluid line connector of the present invention is suitable for use in repairing or connecting A/C lines in a vehicle, which flow low-pressure fluid therethrough. However, the toothed configuration of the ferrule provides greater retention of the fluid lines in the connector, such that the connector may be suitable for use in repairing or connecting higher pressure lines of a vehicle or other applications.

Changes and modifications to the specifically described embodiments may be carried out without departing from the principles of the present invention, which is intended to be limited only by the scope of the appended claims, as interpreted according to the principles of patent law, including the doctrine of equivalents.

The invention claimed is:

1. A fluid line connector for coupling two conduits to be in fluid communication with one another, said connector comprising:
    a main body having a first end portion in fluid communication with a second end portion, said main body defining a fluid passageway along a longitudinal axis from an open outboard end at said first end portion to an inboard portion, said first end portion having an inner surface and an outer surface, wherein said inner surface comprises a conical surface portion between said open outboard end and said inboard portion, and a plurality of circular stepped regions, said conical surface portion having a larger inner diameter disposed toward said open outboard end and a smaller inner diameter disposed toward said inboard portion;
    said stepped regions each having a different inner diameter than an adjacent one of said stepped regions to thereby define respective annular shoulder regions disposed around the longitudinal axis and facing said open outboard end and having different diameters, and each of said annular shoulder regions of said stepped regions configured to engage a different first fluid conduit having an outer diameter that generally corresponds to the inner diameter of an adjacent one of said stepped regions;
    a ferrule defining a fluid passageway along said longitudinal axis, said ferrule having a substantially non-compressible outboard portion and a compressible inboard portion disposed at least partially in said conical surface portion of said inner surface of said main body;
    a conduit coupler having an inner surface configured to receive said outer surface of said main body, said inner surface of said conduit coupler having a ferrule-engaging portion;
    wherein said conduit coupler is operable to urge said ferrule toward said inboard portion of said main body via engagement of said ferrule-engaging portion with said substantially non-compressible outboard portion of said ferrule, to thereby compress said inboard portion of said ferrule radially inwardly against an outer surface of the fluid conduit when the fluid conduit is disposed in the fluid passageway of said main body, to substantially seal and retain the connector at an end of the fluid conduit;
    wherein said second end portion of said main body comprises an outer surface configured to engage an inner surface of a second fluid conduit; and
    at least one crimping band and a crimping element both configured to be disposed around the second fluid conduit and said second end portion of said main body, said crimping element configured to retain said crimping band at the second fluid conduit and said crimping element and said crimping band cooperating to retain the second fluid conduit at said second end portion of said main body.

2. The connector of claim 1, wherein said circular stepped regions are positioned between said conical surface portion and said inboard portion of said main body.

3. The connector of claim 1, wherein said outer surface of said main body comprises a threaded outer portion and said inner surface of said conduit coupler comprises a threaded inner portion corresponding to said threaded outer portion, wherein said conduit coupler is axially movable along said longitudinal axis via rotation of said conduit coupler.

4. The connector of claim 1, wherein said inner surface of said main body further comprises a seal-receiving portion between said conical surface portion and said stepped regions, and said connector further comprising an annular seal disposed in said seal-receiving portion.

5. The connector of claim 4, wherein said annular seal has an inner diameter generally corresponding to the inner diameter of one of said stepped regions.

6. The connector of claim 1, wherein said compressible inboard portion of said ferrule comprises a plurality of longitudinal slots in a circumferentially-spaced arrangement.

7. The connector of claim 6, wherein said compressible inboard portion of said ferrule comprises a conical outer surface that generally corresponds in shape to said conical surface portion of said inner surface of said main body.

8. The connector of claim 1, wherein said compressible inboard portion of said ferrule comprises a generally annular shoulder directed inwardly from an inner surface thereof, said shoulder configured to impinge on the outer surface of the fluid conduit to secure the conduit against removal from said connector.

9. The connector of claim 1, wherein:
said inner surface of said main body comprises at least three of said circular stepped regions;
said outer surface of said main body comprises a threaded outer portion and said inner surface of said conduit coupler comprises a threaded inner portion corresponding to said threaded outer portion; and
said conduit coupler is axially movable along said longitudinal axis via rotation of said conduit coupler.

10. The connector of claim 9, wherein:
said inner surface of said main body further comprises a seal-receiving portion between said conical surface portion and said stepped regions;
said connector further comprises an annular seal disposed in said seal-receiving portion, said annular seal having an inner diameter generally corresponding to the inner diameter of one of said stepped regions;
said compressible inboard portion of said ferrule comprises a plurality of longitudinal slots in a circumferentially-spaced arrangement; and
said compressible inboard portion of said ferrule comprises a conical outer surface that generally corresponds in shape to said conical surface portion of said inner surface of said main body.

11. A fluid line connector for coupling two conduits to be in fluid communication with one another, said connector comprising:
a main body having a first end portion in fluid communication with a second end portion, said main body defining a fluid passageway along a longitudinal axis from an open outboard end at said first end portion to an inboard portion, said first end portion having an inner surface and an outer surface, said outer surface comprising a threaded outer portion, and said inner surface comprising:
a conical surface portion between said open outboard end and said inboard portion, said conical surface portion having a larger inner diameter disposed toward said open outboard end and a smaller inner diameter disposed toward said inboard portion;
a plurality of circular stepped regions, each of said stepped regions having a different inner diameter than an adjacent one of said stepped regions to thereby define respective annular shoulder regions disposed around the longitudinal axis and facing said open outboard end and having different diameters, and each of said annular shoulder regions of said stepped regions configured to engage a different fluid conduit having an outer diameter that generally corresponds to the inner diameter of an adjacent one of said stepped regions; and
a seal-receiving portion between said conical surface portion and said stepped regions;
an annular seal disposed in said seal-receiving portion of said main body;
a ferrule defining a fluid passageway along said longitudinal axis, said ferrule having a substantially non-compressible outboard portion and a compressible inboard portion disposed at least partially in said conical surface portion of said inner surface of said main body, wherein said compressible inboard portion of said ferrule comprises a generally annular shoulder directed inwardly from an inner surface thereof, said shoulder configured to impinge on the outer surface of the fluid conduit to secure the conduit against removal from said connector;
a conduit coupler having an inner surface configured to receive said outer surface of said main body, said inner surface of said conduit coupler having a ferrule-engaging portion, and a threaded inner portion corresponding to said threaded outer portion of said main body; and
wherein said conduit coupler is axially movable along said longitudinal axis via rotation of said conduit coupler to urge said ferrule toward said inboard portion of said main body via threaded engagement of said ferrule-engaging portion with said substantially non-compressible outboard portion of said ferrule, to thereby compress said inboard portion of said ferrule radially inwardly against an outer surface of the fluid conduit when the fluid conduit is disposed in the fluid passageway of said main body, to substantially seal and retain the connector at an end of the fluid conduit;
wherein said second end portion of said main body comprises an outer surface configured to engage an inner surface of a second fluid conduit; and
at least one crimping band and a crimping element both configured to be disposed around the second fluid conduit and said second end portion of said main body, said crimping element configured to retain said crimping band at the second fluid conduit and said crimping element and said crimping band cooperating to retain the second fluid conduit at said second end portion of said main body.

12. The connector of claim 11, wherein said compressible inboard portion of said ferrule comprises a plurality of longitudinal slots in a circumferentially-spaced arrangement, and said compressible inboard portion of said ferrule comprises a conical outer surface that generally corresponds in shape to said conical surface portion of said inner surface of said main body.

13. The connector of claim 11, wherein said inner and outer surfaces of said main body are defined along a first end portion thereof, and wherein said main body further comprises a second end portion in fluid communication with said first end portion, said second end portion having an outer surface configured to engage an inner surface of a second fluid conduit to thereby retain said second fluid conduit at said second end portion of said main body.

* * * * *